(12) United States Patent
Taniguchi et al.

(10) Patent No.: US 7,415,280 B2
(45) Date of Patent: Aug. 19, 2008

(54) DATA OUTPUT SYSTEM, OUTPUT CONTROL TERMINAL, PROGRAM TO BE APPLIED TO OUTPUT CONTROL TERMINAL, AND DATA OUTPUT METHOD

(75) Inventors: Shinya Taniguchi, Suwa (JP); Yoshiki Fukui, Suwa (JP); Naruhide Kitada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 690 days.

(21) Appl. No.: 10/057,945

(22) Filed: Jan. 29, 2002

(65) Prior Publication Data

US 2002/0115451 A1 Aug. 22, 2002

(30) Foreign Application Priority Data

Feb. 9, 2001 (JP) ............................... 2001-034354
Jan. 18, 2002 (JP) ............................... 2002-010703

(51) Int. Cl.
*H04Q 7/20* (2006.01)
*H04M 3/42* (2006.01)

(52) U.S. Cl. ................................. 455/456.1; 455/414.1
(58) Field of Classification Search .............. 455/456.1, 455/456.2, 456.3, 456.4, 456.5, 456.6, 404.2, 455/407, 408, 418, 419, 420, 422.1, 414.1
See application file for complete search history.

(56) References Cited

U.S. PATENT DOCUMENTS

| 5,516,198 | A | * | 5/1996 | Yokoyama | ................. | 297/362 |
| 5,544,321 | A | | 8/1996 | Theimer et al. | | |
| 5,828,855 | A | * | 10/1998 | Walker | .................. | 710/305 |
| 6,493,757 | B1 | * | 12/2002 | Sakai et al. | ................ | 709/226 |
| 6,804,019 | B2 | * | 10/2004 | Shiohara | ................... | 358/1.15 |
| 2001/0024236 | A1 | | 9/2001 | Sato et al. | | |
| 2001/0046067 | A1 | | 11/2001 | Taniguchi | | |
| 2002/0196451 | A1 | * | 12/2002 | Schlonski et al. | ............ | 358/1.1 |
| 2004/0185877 | A1 | * | 9/2004 | Asthana et al. | .......... | 455/456.6 |

FOREIGN PATENT DOCUMENTS

| EP | 1 120 959 A1 | 1/2001 |
| EP | 1 148 424 A1 | 10/2001 |
| EP | 1 158 412 A1 | 11/2001 |
| EP | 1 158 413 A1 | 11/2001 |
| EP | 1 172 724 A1 | 1/2002 |
| EP | 1 176 501 A1 | 1/2002 |

(Continued)

*Primary Examiner*—Melody Mehrpour
(74) *Attorney, Agent, or Firm*—Oliff & Berridge, PLC

(57) ABSTRACT

The invention provides a data output system which can control a printer in accordance with the position of a user without providing a mobile terminal and the printer with special devices, which can reduce the processing load on the mobile terminal, which can ensure the convenience of the user when using the printer, and which avoids inconvenience as a result of incorrect settings by the user. The invention can include a print control terminal that obtains mobile terminal position information from a relay station. When the distance between the mobile terminal position specified by the obtained mobile terminal position information and the printer position specified by printer position information from a storage device is less than a predetermined value, a print command and corresponding print data are transmitted to a printer PR in response to a request from a mobile terminal.

20 Claims, 6 Drawing Sheets

| | FOREIGN PATENT DOCUMENTS | | | JP | A-10-016355 | 1/1998 |
|----|----|----|----|----|----|----|
| EP | 1 176 502 A1 | 1/2002 | | JP | 10-191453 | 7/1998 |
| JP | 06-138821 | 5/1994 | | JP | 10-228502 | 8/1998 |
| JP | 06-293173 | 10/1994 | | JP | A-11-149233 | 6/1999 |
| JP | 9303026 | 11/1997 | | JP | 2000-059533 | 2/2000 |

\* cited by examiner

| PRINTER NAME | INSTALLATION POSITION | CONTROL COMMAND |
|---|---|---|
| PRINTER PR1 | (100, 100) | PRINT COMMAND, PRINT SPECIFICATION CHANGE COMMAND, ATTRIBUTE CONFIRMATION COMMAND, AND ATTRIBUTE CHANGE COMMAND |
| PRINTER PR2 | (50, 100) | PRINT COMMAND AND ATTRIBUTE CONFIRMATION COMMAND |
| ≈ | | ≈ |
| PRINTER PRn | (50, 50) | PRINT COMMAND AND PRINT SPECIFICATION CHANGE COMMAND |

400 PRINTER REGISTRATION TABLE

DATA OUTPUT SYSTEM, OUTPUT CONTROL TERMINAL, PROGRAM TO BE APPLIED TO OUTPUT CONTROL TERMINAL, AND DATA OUTPUT METHOD

BACKGROUND OF THE INVENTION

1. Field of Invention

The present invention relates to systems for printing data requested to be printed by a user of a mobile terminal using a printer connected to a network by using position information from the mobile terminal. The present invention also relates to terminals applied to the systems, and relates to programs to be applied to terminals, and relates to methods which have the same effects with the systems above. More specifically, the present invention relates to a data output system, an output control terminal, a program to be applied to an output control terminal, and a data output method which are suitable for controlling a printer in accordance with the position of a user without providing a mobile terminal and the printer with special devices. The present invention may also be suitable for lessening the processing burden on the mobile terminal, and for ensuring the convenience of users when using the printer while avoiding inconvenience due to incorrect setting by the user.

2. Description of Related Art

A current system for operating an apparatus by remote control using a mobile terminal, for example, a vehicular remote control apparatus, is disclosed in Japanese Unexamined Patent Application Publication No. 9-303026. In such a vehicular remote control apparatus, a vehicular apparatus is operated by remote control by giving a control command from an external mobile terminal using wireless communication device. The vehicular remote control apparatus can include a device for detecting the motion of the mobile terminal, a device for analyzing the pattern of the motion and for recognizing the analyzed pattern of the motion, and a device for generating a control command corresponding to the recognized pattern of the motion. Accordingly, with a simple configuration, many types of operation commands can be accurately discriminated, and various operations can be performed by remote control.

A current system for printing data, for example, a printer is disclosed in Japanese Unexamined Patent Publication No. 6-293173. In such a device, the printer moves a print head in a direction orthogonal to a print-medium feeding direction and transfers ink on an ink ribbon, which is supplied from a ribbon cassette installed therein, to the print medium by using the print head. The printer includes a locking mechanism for locking the ribbon cassette to the printer when the ribbon cassette is installed therein. The printer can further include a first detection device for detecting a near-end when the ink ribbon contained in the ribbon cassette reaches the near-end, and confirmation device for confirming user authentication. The locking mechanism is unlocked on the basis of the logical AND of a detection signal of the first detection device and a confirmation signal of the confirmation device.

Accordingly, only an authenticated user can replace the ribbon cassette by an unused ribbon cassette when the ink ribbon reaches the near-end. The ribbon cassette cannot be replaced by users other than those authenticated. The ribbon cassette cannot be replaced until it reaches the near-end. Thus, ribbon cassettes can be suitably managed. It is therefore possible to prevent disclosure and abuse of important information left on the ink ribbon.

SUMMARY OF THE INVENTION

Currently, network systems for printing data requested by a user to be printed using a printer connected to a network are generally known. In such a network system, when the user instructs the printer to print data from a client terminal which is remote from the printer, and when the data is a highly confidential document or the like, the contents of the printout may be read by an undesired person before the user can get to the printer after giving the print instruction.

If the user can notify the printer of a time for starting the printing of data separately from a time for outputting the data to the printer, it is possible to ensure confidentiality compared with the known network system. Concerning specific techniques for implementing this, for example, the above-described known vehicular remote control apparatus can be adopted, and the printer can operated by remote control using the mobile terminal. Alternatively, the above-described printer can be adopted, and the printer starts printing after receiving user authentication.

In the above-described vehicular remote control apparatus, since the mobile terminal is configured to detect the motion of the mobile terminal, it is necessary to provide a special sensor. Since the mobile terminal is configured to analyze the pattern of the motion of the mobile terminal and to recognize the analyzed motion pattern, the processing burden on the mobile terminal can be heavy.

Since the foregoing known printer is configured to confirm user authentication, it is necessary to provide a special authentication unit.

An example in which the printer is operated by remote control using the mobile terminal will now described for explanation. When all the users can execute the same control commands, it device that relatively important control commands including the setting of the paper size default value and the print quality default value are executable by many users. It is highly likely that incorrect values are set, which is very inconvenient. To solve this problem, it is possible to restrict the number of users who are permitted to set important control commands. However, from the viewpoint of improving convenience, it is preferable that such important control commands, however important they may be, be executable by all the users. Thus, there can be a direct conflict between access and user convenience.

In view of the foregoing unsolved problems encountered with the known art, it is an object of the present invention to provide a data output system, an output control terminal, a program to be applied to output control terminal, and a data output method suitable for controlling a printer in accordance with the position of a user without providing a mobile terminal and the printer with a special device. Accordingly, the present invention can lessen the processing burden on the mobile terminal, ensure the user's convenience of using the printer, and avoid inconvenience due to incorrect setting by the user.

In order to achieve the foregoing objects, a data output system of the present invention connects to an output terminal for outputting data and to a position management terminal for generating mobile terminal position information for specifying the position of a mobile terminal on the basis of a communication state between the mobile terminal and a base station so that the data output system can communicate with the output terminal and the position management terminal. The data output system outputs data requested, by a user of the mobile terminal, to be output using the output terminal. The mobile terminal position information is obtained from the position management terminal. Data output control of the output terminal is performed on the basis of the positional relationship between the mobile terminal position specified by the obtained mobile terminal position information and the output terminal position specified by output terminal position information for specifying the position of the output terminal.

Arranged as described above, the mobile terminal position information is obtained from the position management terminal. Data output control of the output terminal is performed on the basis of the positional relationship between the mobile terminal position specified by the obtained mobile terminal position information and the output terminal position specified by the output terminal position information.

The system can be formed by a single apparatus or a network system to which a plurality of terminals are connected so that the terminals can communicate with one another. In the latter case, each component can belong to any terminal among the plurality of terminals as long as the terminals are connected so that they can communicate with one another.

The output terminal position information can be obtained from the output terminal, from a second position management terminal which generates the output terminal position information, or from a storage device for storing the output terminal position information.

The positional relationship between the mobile terminal position and the output terminal position can be established by the following states. For example, the mobile terminal position is within a predetermined range on the basis of the output terminal position; the mobile terminal position passes through a predetermined position on the basis of the output terminal position; the mobile terminal position approaches the output terminal position; and the mobile terminal is directed to the output terminal. Hereinafter, the same applies to a data output system, an output control terminal, a program to be applied to output control terminal, and a data output method.

The output terminal can be of any structure as long as it is configured to output data. Typical output terminals can include, for example, a display device for displaying data, a sound output device for outputting data using audio, and a print device for printing data. To give an actual example, the output terminal can include, for example, a projector, a printer, a personal computer, an audio unit, a PDA (Personal Digital Assistant), a portable telephone, a watch-type PDA and the like. Hereinafter, the same applies to a data output system, an output control terminal, a program to be applied to output control terminal, and a data output method.

A data output system of the present invention establishes a connection between an output terminal for outputting data and an output control terminal for performing data output control of the output terminal so that they can communicate with each other. The data output system establishes a connection between the output control terminal and a position management terminal for generating mobile terminal position information for specifying the position of a mobile terminal on the basis of a communication state between the mobile terminal and a base station so that they can communicate with each other. The data output system outputs data requested, by a user of the mobile terminal, to be output using the output terminal. The output control terminal can include a storage device for storing output terminal position information for specifying the position of the output terminal, and a position information obtaining device for obtaining the mobile terminal position information from the position management terminal. The data output control of the output terminal is performed on the basis of the positional relationship between the mobile terminal position specified by the mobile terminal position information obtained by the position information obtaining device and the output terminal position specified by the output terminal position information in the storage device.

Arranged as described above, the output control terminal obtains the mobile terminal position information from the position management terminal using the position information obtaining device. Data output control of the output terminal is performed on the basis of the positional relationship between the mobile terminal position specified by the obtained mobile terminal position information and the output terminal position specified by the output terminal position information in the storage device.

The storage device can store the output terminal position information by using any available technique. The output terminal position information can be stored beforehand. Instead of storing the output terminal position information beforehand, the storage device can store the output terminal position information by externally inputting the output terminal position information thereto during operation.

In a data output system of the present invention, according to the data output system above, the output control terminal transmits a data output request to the output terminal when the mobile terminal position is within a predetermined range on the basis of the output terminal position.

Arranged as described above, when the mobile terminal position is within a predetermined range on the basis of the output terminal position, the output control terminal transmits a data output request to the output terminal. When the output terminal receives the data output request, the output terminal outputs data.

In a data output system of the present invention, according to the data output system described above, the output control terminal transmits a data output request to the output terminal when the mobile terminal position is within a predetermined range on the basis of the output terminal position and when a predetermined period of time has passed since the mobile terminal position became within the predetermined range.

Arranged as described above, when the mobile terminal position is within a predetermined range on the basis of the output terminal position and when a predetermined period of time has passed since the mobile terminal position became within the predetermined range, the output control terminal transmits a data output request to the output terminal. When the output terminal receives the data output request, the output terminal outputs data.

A data output system of the present invention, according to the data output system described above, establishes a connection between the output control terminal and the mobile terminal so that they can communicate with each other. The output control terminal can include a control command storage device for storing a specific control command for controlling a specific function of the output terminal. When the mobile terminal position is within a predetermined range on the basis of the output terminal position, the output control terminal transmits a list from which the specific control command is selectable to the mobile terminal. When the output control terminal receives the selection of the specific control command, the output control terminal transmits the specific control command in the control command storage device to the output terminal.

Arranged as described above, when the mobile terminal position is within a predetermined range on the basis of the output terminal position, the output control terminal transmits a list from which the specific control command is selectable to the mobile terminal.

The mobile terminal receives the list from which the specific control command is selectable. When the specific control command is selected from the received list by user operation or the like, the selection of the specific control command is transmitted to the output control terminal.

When the output control terminal receives the selection of the specific control command, the specific control command in the specific control command storage device is transmitted to the output terminal.

When the output terminal receives the specific control command, a specific function is controlled on the basis of the specific control command.

In a data output system of the present invention, according to the data output system described above, the output control terminal transmits the list from which the specific control command is selectable to the mobile terminal when the distance between the output terminal position and the mobile terminal position is less than or equal to a predetermined value. Arranged as described above, the output control terminal transmits the list from which the specific control command is selectable to the mobile terminal when the distance between the terminals is less than or equal to a predetermined value.

In a data output system of the present invention, according to the data output system described above, when the output control terminal receives a registration request for registering the output terminal from the mobile terminal, the output control terminal transmits a transmission request for transmitting the control command list to the output terminal corresponding to the registration request. When the output control terminal receives the control command list in response to the transmission of the transmission request, the output control terminal registers the mobile terminal position information obtained by the position information obtaining device as the output terminal position information in the storage device, and registers the received control command list in the control command storage device so that the control command list corresponds to the output terminal position information. When the output terminal receives the transmission request for transmitting the control command list, the output terminal transmits the control command list including the specific control command to the output control terminal.

Arranged as described above, when the output control terminal receives a registration request from the mobile terminal, the output control terminal transmits a transmission request for transmitting a control command list to the output terminal corresponding to the registration request.

When the output terminal receives the transmission request for transmitting the control command list, the output terminal transmits the control command list including the specific control command to the output control terminal.

When the output control terminal receives the control command list, the mobile terminal position information obtained by the position information obtaining device is registered as the output terminal position information in the storage device, and the received control command list is registered in the control command storage device so that the control command list corresponds to the output terminal position information.

In a data output system of the present invention, according to the data output system described above, the output control terminal can transmit a response request to the output terminal. When the output control terminal receives no response in response to the output request, the output control terminal reads the output terminal position information for the output terminal which gives no response from the storage device. On the basis of the mobile terminal position information obtained by the position information obtaining device, the output control terminal searches for the mobile terminal which is within a predetermined range on the basis of the output terminal position specified by the read output terminal position information. The output control terminal transmits a presence confirmation request for confirming the presence of the output terminal which gives no response to the detected mobile terminal. When the output control terminal receives no presence confirmation in response to the presence confirmation request, the output control terminal clears the registration of the output terminal which gives no response.

Arranged as described above, the output control terminal transmits a response request to the output terminal. When the output control terminal receives no response in response to the response request, the output terminal position information for the output terminal which gives no response is read from the storage device. On the basis of the mobile terminal position information obtained by the position information obtaining device, the output control terminal searches for the mobile terminal which is within a predetermined range on the basis of the output terminal position specified by the read output terminal position information. When the mobile terminal is detected, a presence confirmation request is transmitted to the detected mobile terminal. If no presence confirmation in response to the presence confirmation request is received, the output terminal which gives no response is cleared its registration.

In a data output system of the present invention, according to the data output system above, the output terminal can be a printer.

Arranged as described above, the output control terminal obtains the mobile terminal position information from the position management terminal using the position information obtaining device. Data output control of the printer is performed on the basis of the positional relationship between the mobile terminal position specified by the obtained mobile terminal position information and the output terminal position specified by the output terminal position information in the storage device.

In a data output system of the present invention, according to the data output system above, the output terminal is a projector.

Arranged as described above, the output control terminal obtains the mobile terminal position information from the position management terminal using the position information obtaining device. Data output control of the projector is performed on the basis of the positional relationship between the mobile terminal position specified by the obtained mobile terminal position information and the output terminal position specified by the output terminal position information in the storage device.

In order to achieve the foregoing objects, an output control terminal of the present invention is a terminal for connecting to a position management terminal and an output terminal in a data output system of the present invention so as to communicate with the position management terminal and the output terminal. The output control terminal can include a storage device for storing output terminal position information for specifying the position of the output terminal and a position information obtaining device for obtaining mobile terminal position information from the position management terminal. Data output control of the output terminal is performed on the basis of the positional relationship between the mobile terminal position specified by the mobile terminal position information obtained by the position information obtaining device and the output terminal position specified by the output terminal position information in the storage device.

Arranged as described above, the operation equivalent to that of the output control terminal in the data output system of the present invention can be achieved.

In order to achieve the foregoing objects, a program to be applied to output control terminal of the present invention can be a program to be applied to output control terminal which is made up of the computer. The program can make the computer execute processing in which, data output control performed on the basis of the positional relationship between the mobile terminal position specified by the mobile terminal position information obtained by the position information obtaining device and the output terminal position specified by the output terminal position information in the storage device.

Arranged as described above, when the computer reads the program and executes the processing according to the read program, the operation equivalent to that of the output control terminal of the present invention can be achieved.

In order to achieve the foregoing objects, a data output method of the present invention is a data output method for establishing a connection between an output terminal for outputting data and a position management terminal for generating mobile terminal position information for specifying the position of a mobile terminal on the basis of a communication state between the mobile terminal and a base station so that the data output system can communicate with the output terminal and the position management terminal. The data output method can further output data requested, by a user of the mobile terminal, to be output using the output terminal, wherein the mobile terminal position information is obtained from the position management terminal, and data output control of the output terminal is performed on the basis of the positional relationship between the mobile terminal position specified by the obtained mobile terminal position information and the output terminal position specified by output terminal position information for specifying the position of the output terminal.

Arranged as described above, the operation equivalent to that of the data output system of the present invention can be achieved.

In order to achieve the foregoing objects, a data output method of the present invention is a data output method for establishing a connection between an output terminal for outputting data and an output control terminal for performing data output control of the output terminal so that they can communicate with each other, for establishing a connection between the output control terminal and a position management terminal for generating mobile terminal position information for specifying the position of a mobile terminal on the basis of a communication state between the mobile terminal and a base station so that they can communicate with each other, and for outputting data requested, by a user of the mobile terminal, to be output using the output terminal. The output control terminal can perform the steps of storing output terminal position information for specifying the position of the output terminal, and obtaining the mobile terminal position information from the position management terminal. The data output control of the output terminal being performed on the basis of the positional relationship between the mobile terminal position specified by the obtained mobile terminal position information and the output terminal position specified by the stored output terminal position information.

Arranged as described above, the operation equivalent to that of the data output system of the present invention can be achieved.

In order to achieve the foregoing objects, a data output method of the present invention is a data output method of the present invention above, wherein the output control terminal transmits a data output request to the output terminal when the mobile terminal position is within a predetermined range on the basis of the output terminal position. Arranged as described above, the operation equivalent to that of the data output system of the present invention can be achieved.

In order to achieve the foregoing objects, a data output method of the present invention is a data output system above, wherein the output control terminal transmits a data output request to the output terminal when the mobile terminal position is within a predetermined range on the basis of the output terminal position and when a predetermined period of time has passed since the mobile terminal position became within the predetermined range.

Arranged as described above, the operation equivalent to that of the data output system of the present invention can be achieved.

In order to achieve the foregoing objects, a data output method of the present invention is a data output method above, wherein the data output method establishes a connection between the output control terminal and the mobile terminal so that they can communicate with each other, the output control terminal stores a specific control command for controlling a specific function of the output terminal, and when the mobile terminal position is within a predetermined range on the basis of the output terminal position, the output control terminal transmits a list from which the specific control command is selectable to the mobile terminal, and when the output control terminal receives the selection of the specific control command, the output control terminal transmits the stored specific control command to the output terminal.

Arranged as described above, the operation equivalent to that of the data output system of the present invention can be achieved.

In order to achieve the foregoing objects, a data output method of the present invention is a data output method above, wherein the output control terminal transmits the list from which the specific control command is selectable to the mobile terminal when the distance between the output terminal position and the mobile terminal position is less than or equal to a predetermined value.

Arranged as described above, the operation equivalent to that of the data output system of the present invention can be achieved.

In order to achieve the foregoing objects, a data output method of the present invention is a data output method above, wherein, when the output control terminal receives a registration request for registering the output terminal from the mobile terminal, the output control terminal transmits a transmission request for transmitting the control command list to the output terminal corresponding to the registration request, when the output control terminal receives the control command list in response to the transmission of the transmission request, the output control terminal registers the obtained mobile terminal position information as the output terminal position information, and registers the received control command list so that the control command list corresponds to the output terminal position information, and when the output terminal receives the transmission request for transmitting the control command list, the output terminal transmits the control command list including the specific control command to the output control terminal.

Arranged as described above, the operation equivalent to that of the data output system of the present invention can be achieved.

In order to achieve the foregoing objects, a data output method of the present invention is a data output method above, wherein the output control terminal transmits a response request to the output terminal, when the output control terminal receives no response in response to the output request, the output control terminal reads the stored output terminal position information for the output terminal which gives no response, on the basis of the obtained mobile terminal position information, the output control terminal searches for the mobile terminal which is within a predetermined range on the basis of the output terminal position specified by the read output terminal position information, the output control terminal transmits to the detected mobile terminal a presence confirmation request for confirming the presence of the output terminal which gives no response, and when the output control terminal receives no presence confirmation in response to the presence confirmation request, the output control terminal clears the registration of the output terminal which gives no response.

Arranged as described above, the operation equivalent to that of the data output system of the present invention can be achieved.

Although the data output system, the output control terminal, the program to be applied to output control terminal, and the data output method for achieving the foregoing objects have been proposed, it is possible to propose a storage medium described below in order to achieve the foregoing objects.

A computer-readable storage medium has stored therein a program to be applied to the output control terminal of the present invention. The program causes a computer, which having or being capable of using the storage device for storing the output terminal position information for specifying the position of the output terminal and position information obtaining device for obtaining the mobile terminal position information from the position management terminal, to perform data output control of the output terminal on the basis of the positional relationship between the mobile terminal position specified by the mobile terminal position information obtained by the position information obtaining device and the output terminal position specified by the output terminal position information in the storage device.

Arranged as described above, the program stored in the storage medium is read by the computer, and the computer executes the processing in accordance with the read program. Accordingly, the operation and advantages equivalent to the output control terminal of the present invention can be achieved.

BRIEF DESCRIPTION OF THE DRAWINGS

The invention will be described with reference to the accompanying drawings, wherein like numbers reference like elements, and wherein.

DETAILED DESCRIPTION OF PREFERRED EMBODIMENTS

With reference to the drawings, the present invention will be further illustrated with embodiments below. FIGS. 1 to 7 illustrate an exemplary embodiment of a data output system, an output control terminal, a program to be applied to output control terminal, and a data output system according to the present invention.

Figure 1:
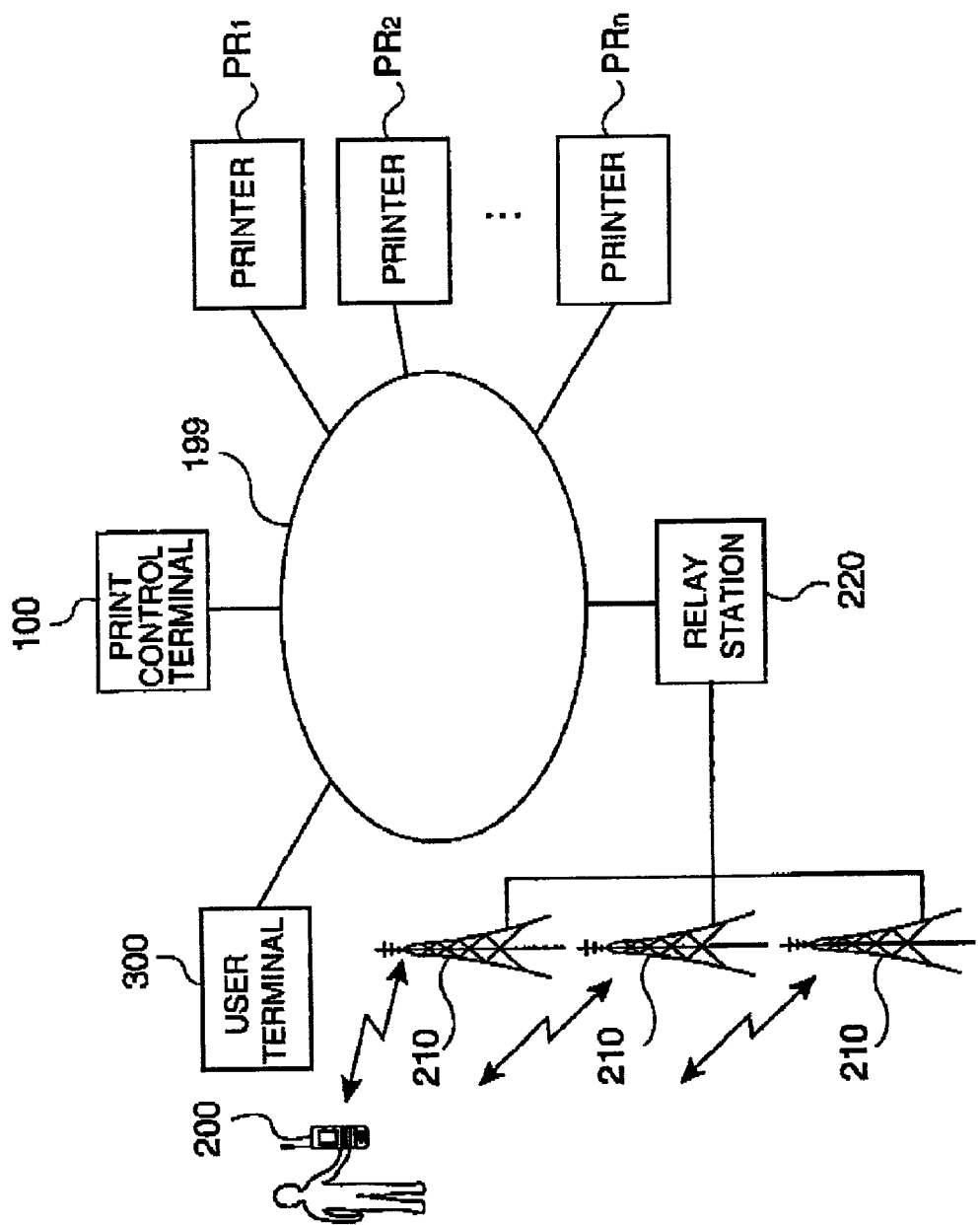
FIG. 1 is an exemplary block diagram showing the configuration of a network system to which the present invention is applied.

In this embodiment, the data output system, the output control terminal, a program to be applied to output control terminal, and a data output method according to the present invention are applied to a case, as shown in FIG. 1, in which data requested by a user to be printed is printed by printers $PR_1$ to $PR_n$ connected to the Internet 199.

Referring to FIG. 1, the configuration of a network system to which the present invention is applied will now be described. FIG. 1 is an exemplary block diagram showing the configuration of a network system to which the present invention is applied.

As shown in FIG. 1, the printers $PR_1$ to $PR_n$ for printing data, a print control terminal 100 for performing data print control of the printers $PR_1$ to $PR_n$, a relay station 220 for relaying communication between a mobile terminal 200 and the Internet 199, and a user terminal 300 which is used by a user are connected to the Internet 199. In order to simplify the description, only one mobile terminal 200 and only one user terminal 300 are shown in the drawing. Actually, a plurality of mobile terminals and a plurality of user terminals are connected to the Internet 199. In the following description, the printers $PR_1$ to $PR_n$ may be collectively referred to as a printer PR.

A plurality of base stations 210 for wirelessly communicating with the mobile terminal 200 are connected to the relay station 220. When the mobile terminal 200 is to establish a connection to the Internet 199, the relay station 220 functions, in place of the mobile terminal 200, as a terminal on the Internet 199 and transmits data from the mobile terminal 200, which is received through the base stations 210, to a target terminal over the Internet 199. Also, the relay station 220 transmits data from a target terminal on the Internet 199 to the mobile terminal 200 through the base stations 210.

The relay station 220 generates mobile terminal position information for specifying the position of the mobile terminal 200. Since the mobile terminal 200 simultaneously communicates with at least three base stations 210, the relay station 220 obtains the time differences among periods of time during which electromagnetic waves from the mobile terminal 200 reach the base stations 210. The current position of the mobile terminal 200 is detected on the basis of the obtained time differences, and hence the mobile terminal position information for specifying the position of the mobile terminal 200 is generated.

The mobile terminal 200 is configured to include the same functions as a general computer in which a CPU, a ROM, a RAM, an I/F, and the like are interconnected by a bus. Using a predetermined application, the mobile terminal 200 communicates with the print control terminal 100, so that the mobile terminal 200 can transmit/receive a command list from which control commands for controlling the printers $PR_1$ to $PR_n$ are selectable.

The user terminal 300 can be configured to include the same functions as a general computer in which a CPU, a ROM, a RAM, an I/F, and the like are interconnected by a bus. When printing data by the printers $PR_1$ to $PR_n$, the user terminal 300 transmits identification information for specifying the user's mobile terminal 200 and print data to the print control terminal 100. When the print control terminal 100 receives the identification information and the print data, the print control terminal 100 does not immediately transmit the received print data to the printers $PR_1$ to $PR_n$. Instead, the print control terminal 100 stores and queues the received print data as data requested to be printed by the user of the mobile terminal 200 specified by the received identification information. In response to a print command from the mobile terminal 200 specified by the identification information, the print control terminal 100 transmits the print data to the printers $PR_1$ to $PR_n$.

Figures 2, 3:
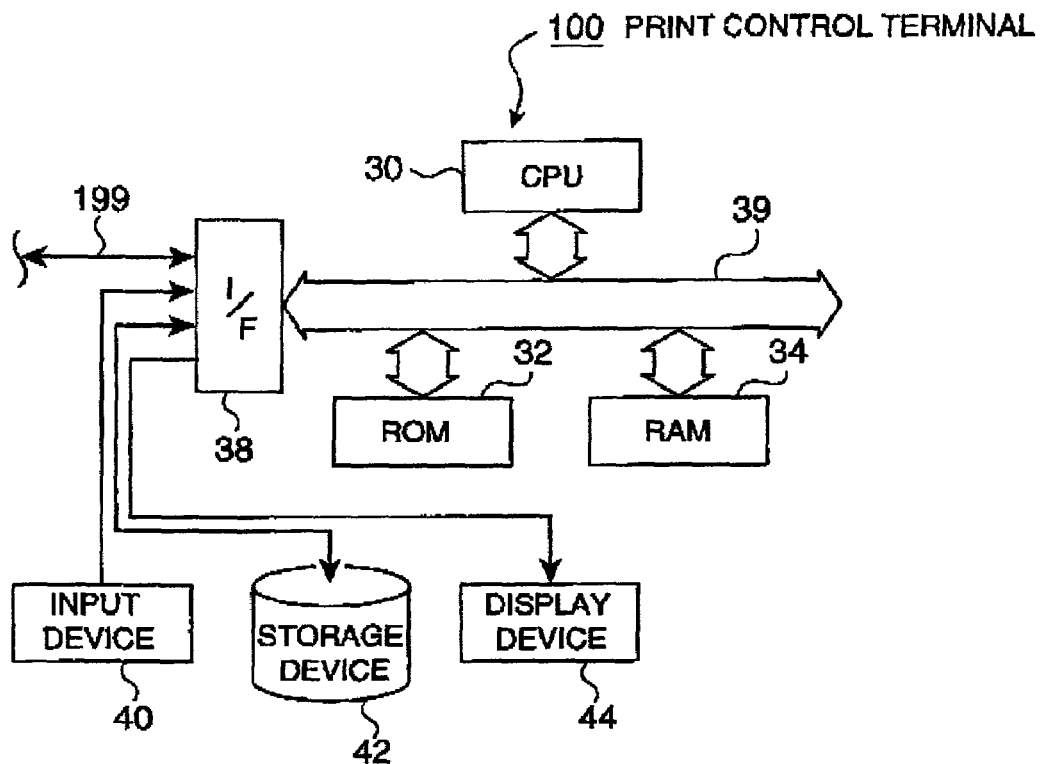
FIG. 2 is an exemplary block diagram showing the structure of a print control terminal 100.
FIG. 3 illustrates an exemplary data structure of a printer registration table 400.

Referring to FIG. 2, the structure of the print control terminal 100 will now be described in greater detail. FIG. 2 is an exemplary block diagram showing the structure of the print control terminal 100.

As shown in FIG. 2, the print control terminal 100 can include a CPU 30 for controlling the operation and the entire system on the basis of a control program, a ROM 32 which stores beforehand the control program for the CPU 30 and the like in a predetermined region, a RAM 34 for storing data read from the ROM 32 and the operation results which are necessary in the course of operation of the CPU 30, and an I/F 38 for interfacing the data input/output with external devices. These components are interconnected by a bus 39, which is a signal line for transferring data, so that these components can exchange data with one another.

The external devices are connected to the I/F 38. Specifically, an input device 40 including a keyboard and a mouse which functions as a human interface for inputting data, a storage device 42 for storing data and tables as files, a display device 44 for displaying a screen on the basis of image signals, and a signal line for establishing a connection with the Internet 199 are connected to the I/F 38.

As shown in FIG. 3, the storage device 42 stores therein a printer registration table 400 in which the printers $PR_1$ to $PR_n$ are registered so that the printers $PR_1$ to $PR_n$ correspond to printer position information for specifying the positions thereof. FIG. 3 illustrates an exemplary data structure of the printer registration table 400.

In the printer registration table 400, as shown in FIG. 3, one record is registered for each of the printers $PR_1$ to $PR_n$. Each record can include a field 402 in which the name of the printer PR is registered, a field 404 in which the coordinates of the installation position of the printer PR, i.e., the printer position information, are registered, and a field 406 in which a control command(s) for controlling the printer PR is registered.

In the field 406, one or a plurality of control commands are registered. When registering a plurality of control commands, a print command is registered at the top. The other specific control commands are registered in such a manner that more important commands are registered near the bottom. As a result, more important specific control commands cannot be executed unless the distance between the mobile terminal 200 and the printer PR is small.

In the example shown in FIG. 3, the first record registers "Printer $PR_1$" as the printer name in the field 402; "(100, 100)" as the coordinates of the installation position in the field 404, and "print command, print specification change command, attribute confirmation command, and attribute change command" as control commands in the field 406. This device that the printer $PR_1$ is installed at the installation position (100, 100) and that the print command and three other specific control commands are executable.

The CPU 30 can be formed by a micro-processing unit MPU or the like. The CPU 30 activates a predetermined program stored in a predetermined region of the ROM 32. In accordance with the program, the CPU 30 executes a print request responding process, a control command transmitting process, a printer registration process, and a printer deregistration process, which are shown in flowcharts in FIGS. 4 to 7, on a time-sharing basis.

Figure 4:
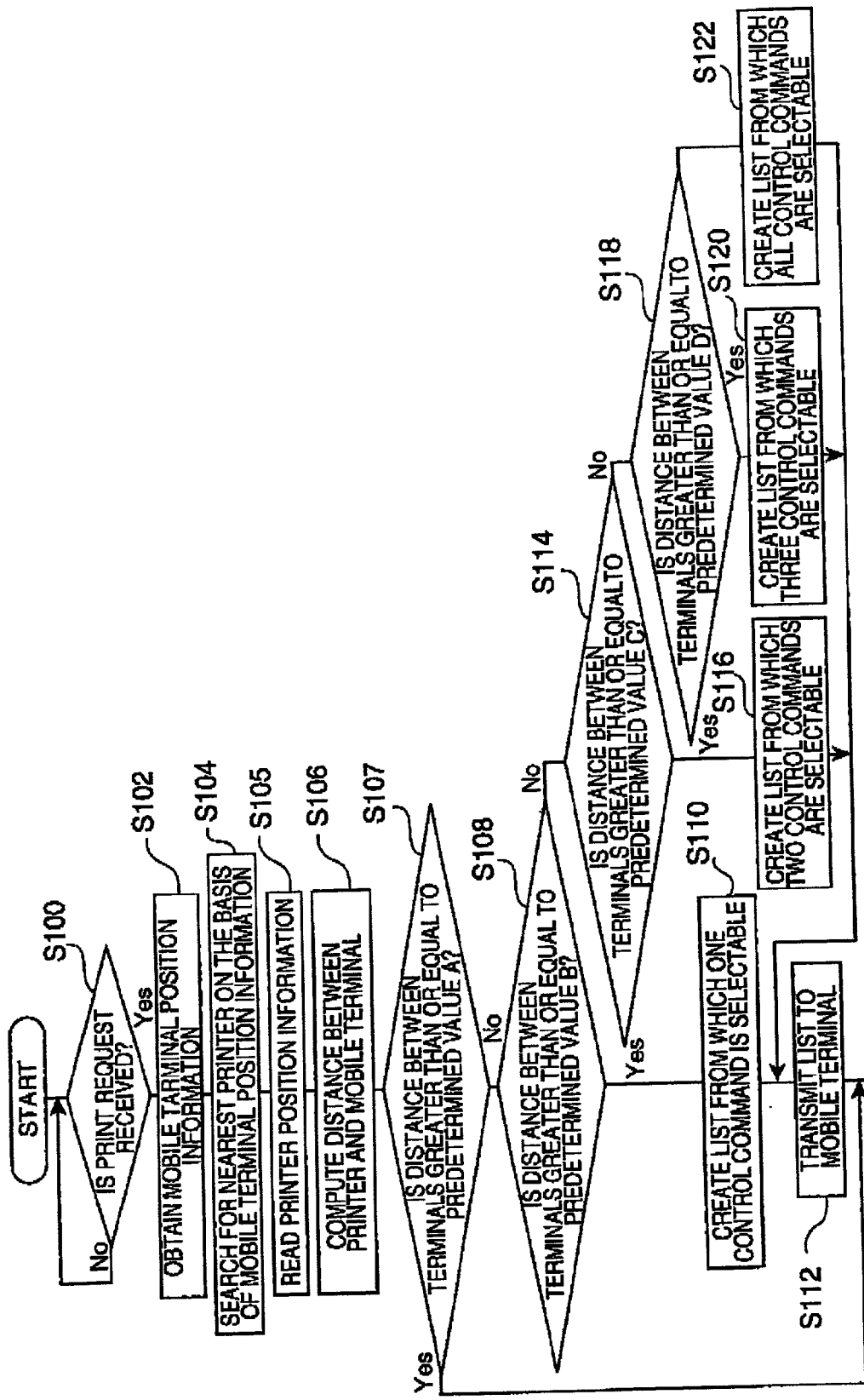
FIG. 4 is a flowchart showing an exemplary print request responding process.

Referring to FIG. 4, the print request responding process will now be described in detail. FIG. 4 is a flowchart showing an exemplary print request responding process.

The print request responding process is a process for responding to a print request from the mobile terminal 200. When the print request responding process is executed by the CPU 30, as shown in FIG. 4, the process proceeds to step S100.

In step S100, the process determines whether or not a print request is received. If it is determined that the print request is received (Yes), the process proceeds to step S102. If it is determined otherwise (No), the process enters a standby mode in step S100 until the process receives a print request.

In step S102, the process obtains mobile terminal position information from the relay station 220. In step S104, the process searches the printer registration table 400 for the printer PR which is nearest to the mobile terminal 200 on the basis of the obtained mobile terminal position information. In step S105, the process reads the printer position information corresponding to the detected printer PR from the printer registration table 400 and proceeds to step S106.

In step S106, the printer computes the distance between the mobile terminal position specified by the obtained mobile terminal position information and the printer position specified by the read printer position information. In step S107, the process determines whether or not the computed distance between the terminals is greater than or equal to a predetermined value A (for example, 15 m). If it is determined that the distance is greater than or equal to the predetermined value A (Yes), a series of processing steps is terminated, and the process returns. If it is determined otherwise (No), the process proceeds to step S108.

In step S108, the process determines whether or not the computed distance between the terminals is greater than or equal to a predetermined value B (such as 10 m) which is less than the predetermined value A. If it is determined that the distance is greater than or equal to the predetermined value B (Yes), the process proceeds to step S110. In step S110, the process reads one control command from the printer registration table 400 and creates a command list from which the read control command is selectable. In step S112, the process transmits the created command list to the mobile terminal 200. A series of processing steps is terminated, and the process returns.

In contrast, if the process determines in step S108 that the computed distance between the terminals is less than the predetermined value B (No), the process proceeds to step S114. In step S114, the process determines whether or not the computed distance between the terminals is greater than or equal to a predetermined value C (such as 5 m) which is less than the predetermined value B. If it is determined that the distance is greater than or equal to the predetermined value C (Yes), the process proceeds to step S116. In step S116, the process reads two control commands from the printer registration table 400, creates a command list from which the read control commands are selectable, and proceeds to step S112.

In contrast, if it is determined in step S114 that the computed distance between the terminals is less than the predetermined value C (No), the process proceeds to step S118. In step S118, the process determines whether or not the computed distance between the terminals is greater than or equal to a predetermined value D (for example, 3 m) which is less than the predetermined value C. If it is determined that the distance is greater than or equal to the predetermined value D (Yes), the process proceeds to step S120. In step S120, the process reads three control commands from the printer registration table 400, creates a command list from which the read control commands are selectable, and proceeds to step S112.

In contrast, if it is determined in step S118 that the computed distance between the terminals is less than the predetermined value D (No), the process proceeds to step S122. In step S122, the process reads all control commands from the printer registration table, creates a command list from which the read control commands are selectable, and proceeds to step S112.

Figure 5:
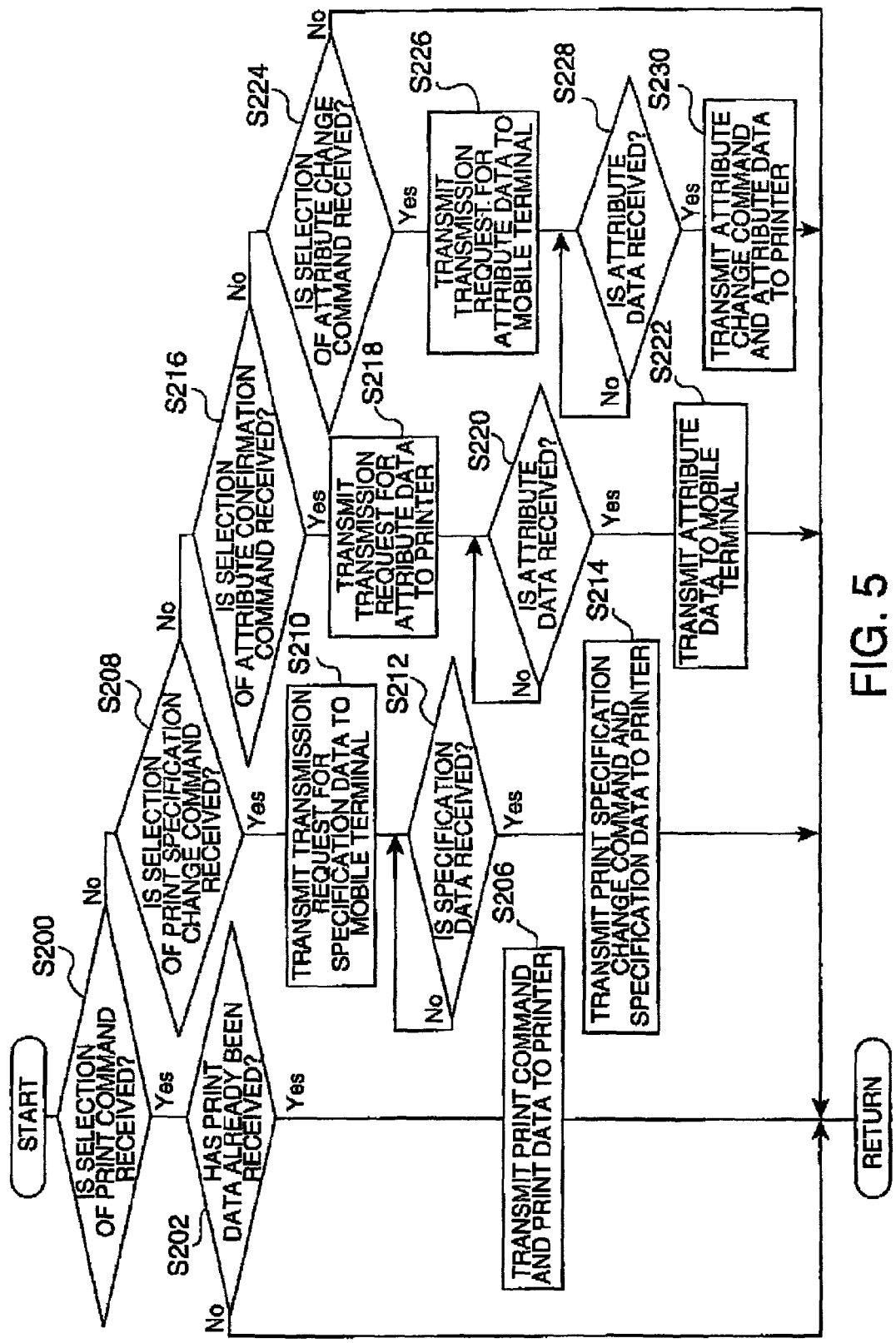
FIG. 5 is a flowchart showing an exemplary control command transmitting process.

With reference to FIG. 5, the control command transmitting process will now be described in detail. FIG. 5 is a flowchart showing an exemplary control command transmitting process.

When the control command transmitting process receives the selection of the print command, the print specification change command, the attribute confirmation command, and the attribute change command from the command list transmitted to the mobile terminal 200, the control command transmitting process transmits the corresponding control commands to the printers $PR_1$ to $PR_n$. When the process is executed by the CPU 30, as shown in FIG. 5, the process proceeds to step S200.

In step S200, the process determines whether or not it has received the selection of the print command for starting printing the print data from the command list transmitted to the mobile terminal 200. If it is determined that the selection of the print command has been received (Yes), the process proceeds to step S202 and determines whether the print data to be printed has already been received from the user terminal 300. Specifically, in step S202, the process searches the stored and queued print data for the print data corresponding to the identification information of the mobile terminal 200 which has transmitted the selection of the print command. If the corresponding print data is detected, it is determined that the print data has already been received. If no corresponding print data is detected, it is determined that the print data has not yet been received.

If it is determined in step S202 that the print data has already been received (Yes), the process proceeds to step S206 and transmits the print command among the control commands in the printer registration table 400 and the corresponding print data to the printer PR which is detected in step S104. A series of processing steps are terminated, and the process returns.

In contrast, when it is determined in step S202 that the print data has not yet been received (No), a series of processing steps are terminated, and the process returns.

In contrast, when it is determined in step S200 that the selection of the print command has not been received (No), the process proceeds to step S208. In step S208, the process determines whether or not the selection of the print specification change command for changing the print specification of printing the print data, such as the paper size and the print quality, has been received. If it is determined that the selection of the print specification change command has been received (Yes), the process proceeds to step S210 and transmits a transmission request for transmitting specification data indicating the print specification to be changed. The process proceeds to step S212.

In step S212, the process determines whether or not the specification data has been received. If it is determined that the specification data has been received (Yes), the process proceeds to step S214 and transmits the print specification change command among the control commands in the printer registration table 400 and the received specification data to the printer PR detected in step S104. A series of processing steps is terminated, and the process returns.

In contrast, if it is determined in step S212 that no specification data has been received (No), the process enters a standby mode in step S212 until the process receives the specification data.

In contrast, when it is determined in step S208 that the selection of the print specification change command is not received (No), the process proceeds to step S216. In step S216, the process determines whether the selection of the attribute confirmation command for confirming the attributes of the printers $PR_1$ to $PR_n$, such as the paper size and the printing quality default value, has been received. If it is determined that the selection of the attribute confirmation command has been received (Yes), the process proceeds to step S218. In step S218, the process transmits a transmission request for transmitting attribute data indicating the current attributes of the printer PR to the printer PR detected in step S104 and proceeds to step S220.

In step S220, the process determines whether or not the attribute data has been received. If it is determined that the attribute data has been received (Yes), the process proceeds to step S222 and transmits the received attribute data to the mobile terminal 200. A series of processing steps is terminated, and the process returns.

In contrast, when it is determined in step S220 that no attribute data has been received (No), the process enters a standby mode until the process receives the attribute data.

In contrast, when it is determined in step S216 that the selection of the attribute confirmation command is not received (No), the process proceeds to step S224. In step S224, the process determines whether or not the selection of the attribute change command, from the command list transmitted to the mobile terminal 200, for changing the attributes of the printers $PR_1$ to $PR_n$ has been received. If it is determined that the selection of the attribute change command has been received (Yes), the process proceeds to step S226 and transmits a transmission request for transmitting attribute data indicating the attributes of the printer PR to be changed. The process proceeds to step S228.

In step S228, the process determines whether or not the attribute data has been received. If it is determined that the attribute data has been received (Yes), the process proceeds to step S230 and transmits the attribute change command among the control commands in the printer registration table 400 and the received attribute data to the printer PR detected in step S104. A series of processing steps are terminated, and the process returns.

In contrast, when it is determined in step S228 that no attribute data has been received (No), the process enters a standby mode in step S228 until the process receives the attribute data.

In contrast, when it is determined in step S224 that the selection of the attribute change command is not received (No), a series of processing steps are terminated and the process returns.

Figure 6:
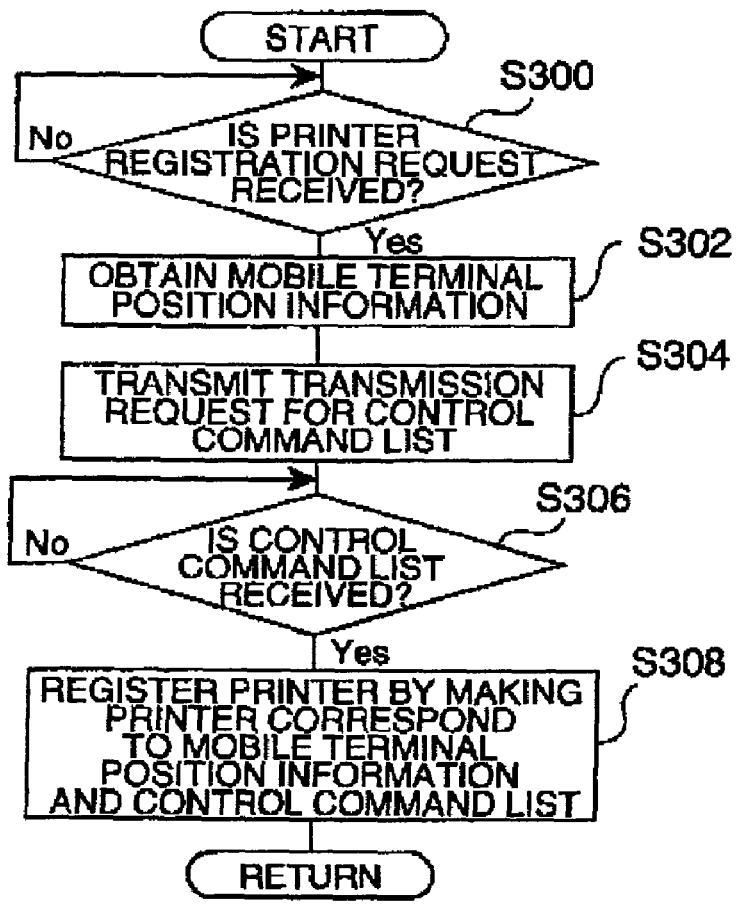
FIG. 6 is a flowchart showing an exemplary printer registration process.

With reference to FIG. 6, the printer registration process will now be described in detail. FIG. 6 is a flowchart showing an exemplary printer registration process.

The printer registration process registers the printers $PR_1$ to $PR_n$ in the printer registration table 400. When the CPU 30 executes the process, as shown in FIG. 6, the process proceeds to step S300.

In step S300, the process determines whether or not a registration request for registering the printer PR has been received. If it is determined that the registration request for the printer PR has been received (Yes), the process proceeds to step S302. If it is determined otherwise (No), the process enters a standby mode in step S300 until the process receives the registration request.

In step S302, the process obtains mobile terminal position information from the relay station 220. In step S304, the process transmits a transmission request for transmitting the control command list to the printer PR corresponding to the registration request. The process proceeds to step S306.

In step S306, the process determines whether or not the control command list has been received. If it is determined that the control command list has been received (Yes), the process proceeds to step S308. In step S308, the printer PR corresponding to the registration request is registered in the printer registration table 400 so that the printer PR corresponds to the obtained mobile terminal position information and the received control command list. A series of processing steps are terminated, and the process returns.

In contrast, when it is determined in step S306 that no control command list is received (No), the process enters a standby mode in step S306 until the process receives the control command list.

Figure 7:
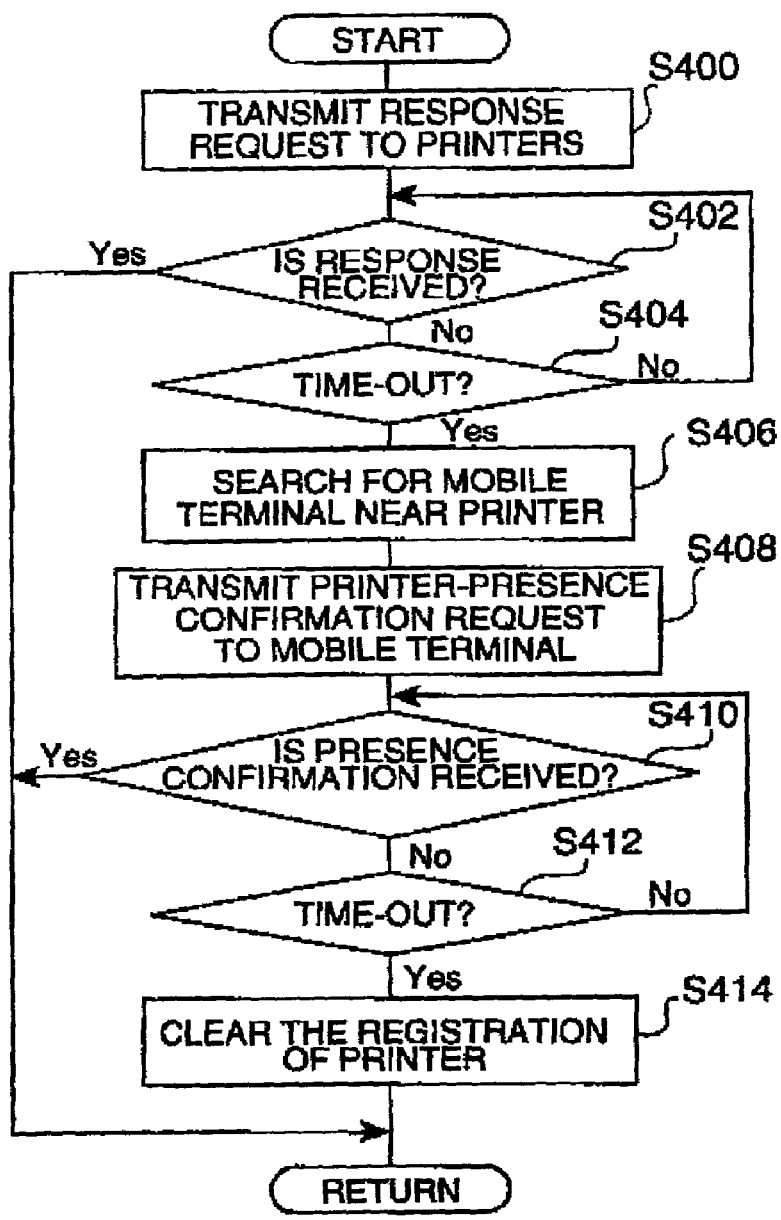
FIG. 7 is a flowchart showing an exemplary printer deregistration process.

With reference to FIG. 7, the printer deregistration process will now be described in detail. FIG. 7 is a flowchart showing an exemplary printer deregistration process.

The printer deregistration process is performed periodically (such as every week) and clears the registration of the printers $PR_1$ to $PR_n$ from the printer registration table 400. When the process is executed by the CPU 30, as shown in FIG. 7, the process proceeds to step S400.

In step S400, the process transmits a response request to all the printers $PR_1$ to $PR_n$ in the printer registration table 400. In step S402, the process determines whether a response in response to the response request has been received. If it is determined that no response is received (No), the process proceeds to step S404 and determines whether or not a predetermined period of time (such as one minute) has passed since the transmission of the response request. If it is determined that the predetermined period of time has passed (Yes), the process proceeds to step S406. If it is determined otherwise (No), the process proceeds to step S402.

In step S406, among the mobile terminals 200 which are within a predetermined range on the basis of the printer PR which has given no response, the process searches for the mobile terminal 200 which is nearest to the printer PR. In step S408, the process transmits a presence confirmation request for confirming the presence of the printer PR to the detected mobile terminal 200. The process proceeds to step S410.

In step S410, the process determines whether or not the presence confirmation has been received. If it is determined that no presence confirmation is received (No), the process proceeds to step S412 and determines whether or not a predetermined period of time (such as five minutes) has passed since the transmission of the presence confirmation request. If it is determined that the predetermined period of time has passed (Yes), the process proceeds to step S414. If it is determined otherwise (No), the process proceeds to step S410.

In step S414, of the printers $PR_1$ to $PR_n$ registered in the printer registration table 400, the process clears the registration of the printer PR which has given no response. A series of processing steps are terminated, and the process returns.

In contrast, if it is determined in step S402 that the response has been received (Yes), or if it is determined in step S410 that the presence confirmation has been received (Yes), a series of processing steps are terminated, and the process returns.

The operation of the foregoing embodiment will now be described.

A case in which data desired by a user is to be printed by the printer $PR_1$ will now be described.

When the user wants to print print data, the user transmits the identification information of the user's mobile terminal 200 and the print data to the print control terminal 100 from the user terminal 300. Alternatively, the user terminal 300 can register in advance the identification information of the mobile terminal 200. When printing is instructed by an application or the like, the identification information of the mobile terminal 200 and the print data can be automatically transmitted to the print control terminal 100.

When the print control terminal 100 receives the identification information and the print data, the received print data is registered in the storage device 42 so as to correspond to the received identification information. The print control terminal 100 enters a state in which it waits for a print command from the mobile terminal 200.

In order to give a print command, the user with the mobile terminal 200 approaches the printer $PR_1$ that the user desires to print the print data. The user transmits a print request to the print control terminal 100 within a range wherein the distance between the mobile terminal 200 and the printer $PR_1$ is less than the predetermined value A and greater than or equal to the predetermined value B.

When the print control terminal 100 receives the print command, in steps S102 and S104, the mobile terminal position information is obtained from the relay station 220. On the basis of the obtained mobile terminal position information, the printer registration table 400 is searched for the printer $PR_1$ which is nearest to the mobile terminal 200. In steps S105 and S106, the printer position information corresponding to the detected printer $PR_1$ is read from the printer registration table 400. The distance between the mobile terminal position specified by the obtained mobile terminal position information and the printer position specified by the read printer position information is computed. Since the distance between the mobile terminal 200 and the printer $PR_1$ is less than the predetermined value A and greater than or equal to the predetermined value B, in steps S108 to S12, a command list from which the print command is selectable is created, and the created command list is transmitted to the mobile terminal 200.

When the mobile terminal 200 receives the command list, the print command is displayed on the basis of the received command list. The user is requested to select a command from the displayed command list. When the user selects the print command, the selection of the print command is transmitted to the print control terminal 100.

When the selection of the print command is received by the print control terminal 100, since the print data to be printed has already been received from the user terminal 300, in steps S200 to S206, the print command among the control commands in the printer registration table 400 and the corresponding print data are transmitted to the printer $PR_1$.

When the printer $PR_1$ receives the print command and the print data, printing is performed on the basis of the received print data. Accordingly, the user can print the data desired by the user using the printer $PR_1$.

Next, a case is described in which the user who has transmitted the print data from the user terminal 300 then approaches the printer $PR_1$ and transmits the print request to the print control terminal 100 within a range wherein the distance between the mobile terminal 200 and the printer $PR_1$ is less than the predetermined value B and greater than or equal to the predetermined value C.

In this case, when the print control terminal 100 receives the print request, in steps S100 to S106, the distance between the mobile terminal position and the printer position is similarly computed. Since the distance between the mobile terminal 200 and the printer PR$_1$ is less than the predetermined value B and greater than or equal to the predetermined value C, in steps S114, S116, and S112, a command list from which the print command and the print specification change command are selectable is created, and the created command list is transmitted to the mobile terminal 200.

When the mobile terminal 200 receives the command list, the control command and the print specification change command are displayed on the basis of the received command list. The user is requested to select a command from the displayed command list. When the user selects the print specification change command, the selection of the print specification change command is transmitted to the print control terminal 100. When the user selects the print command, the operation is the same as that described above, and hence a description thereof is omitted.

When the print control terminal 100 receives the selection of the print specification change command, in steps S208 and S210, a transmission request for specification data to be changed is transmitted to the mobile terminal 200.

When the mobile terminal 200 receives the transmission request for the specification data, the user is requested to input the print specification to be changed. When the user inputs the print specification to be changed, specification data indicating the print specification is transmitted to the print control terminal 100.

When the print control terminal 100 receives the specification data, in steps S212 and S214, the print specification change command among the control commands in the printer registration table 400 and the received specification data are transmitted to the printer PR$_1$.

When the printer PR$_1$ receives the print specification change command and the specification data, the print specification is changed on the basis of the received specification data. Accordingly, the user can change the print specification of the printer PR$_1$.

Next, a case is described in which the user having transmitted the print data from the user terminal 300 then approaches the printer PR$_1$ and transmits the print request to the print control terminal 100 within a range wherein the distance between the mobile terminal 200 and the printer PR$_1$ is less than the predetermined value C and greater than or equal to the predetermined value D.

In this case, when the print control terminal 100 receives the print request, in steps S100 to S106, the distance between the mobile terminal position and the printer position is similarly computed. Since the distance between the mobile terminal 200 and the printer PR$_1$ is less than the predetermined value C and greater than or equal to the predetermined value D, in steps S118, S120, and S112, a command list from which the print command, the print specification change command, and the attribute confirmation command are selectable is created, and the created command list is transmitted to the mobile terminal 200.

When the mobile terminal 200 receives the command list, the control command, the print specification change command, and the attribute confirmation command are displayed on the basis of the received command list. The user is requested to select a command from the displayed command list. When the user selects the attribute confirmation command, the selection of the attribute confirmation command is transmitted to the print control terminal 100. When the print command or the print specification change command is selected, the operation is the same as that described above, and hence a description thereof is omitted.

When the print control terminal 100 receives the selection of the attribute confirmation command, in steps S216 and S218, a transmission request for attribute data indicating the current attributes of the printer PR is transmitted to the printer PR$_1$.

When the printer PR$_1$ receives the transmission request for the attribute data, the attribute data indicating the current attributes is transmitted to the print control terminal 100.

When the print control terminal 100 receives the attribute data, in steps S220 and S222, the received attribute data is transmitted to the mobile terminal 200.

When the mobile terminal 200 receives the attribute data, the attributes of the printer PR$_1$ are displayed on the basis of the received attribute data. Accordingly, the user can confirm the attributes of the printer PR$_1$.

Next, a case is described in which the user having transmitted the print data from the user terminal 300 then approaches the printer PR$_1$ and transmits the print request to the print control terminal 100 within a range wherein the distance between the mobile terminal 200 and the printer PR$_1$ is less than the predetermined value D.

In this case, when the print control terminal 100 receives the print request, in steps S100 to S106, the distance between the mobile terminal position and the printer position is similarly computed. Since the distance between the mobile terminal 200 and the printer PR$_1$ is less than the predetermined value D, in steps S118, S122, and S112, a command list from which the print command, the print specification change command, the attribute confirmation command, and the attribute change command are selectable is created, and the created command list is transmitted to the mobile terminal 200.

When the mobile terminal 200 receives the command list, the print command, the print specification change command, the attribute confirmation command, and the attribute change command are displayed on the basis of the received command list. The user is requested to select a command from the displayed command list. When the user selects the attribute change command, the selection of the attribute change command is transmitted to the print control terminal 100. When the print command, the print specification change command, or the attribute confirmation command is selected, the operation is the same as that described above, and hence a description thereof is omitted.

When the print control terminal 100 receives the selection of the attribute change command, in steps S224 and S226, a transmission request for attribute data to be changed is transmitted to the mobile terminal 200.

When the mobile terminal 200 receives the transmission request for the attribute data, the user is requested to input an attribute(s) of the printer PR$_1$ to be changed. When the user inputs the attribute(s) of the printer PR$_1$ to be changed, the attribute data indicating the attribute(s) is transmitted to the print control terminal 100.

When the print control terminal 100 receives the attribute data, in steps S228 and S230, the attribute change command among the control commands in the printer registration table 400 and the received attribute data are transmitted to the printer PR$_1$.

When the printer PR$_1$ receives the attribute change command and the attribute data, the attribute(s) is changed on the basis of the received attribute data. Accordingly, the user can change the attribute(s) of the printer PR$_1$.

A case in which a new printer PR is to be registered in the printer registration table 400 will now be described.

When registering a new printer PR (for example, a printer $PR_{n+1}$), the user approaches the printer $PR_{n+1}$ and transmits a registration request for registering the printer PR to the print control terminal 100. When the print control terminal 100 receives the registration request for registering the printer PR, in steps S302 and S304, the mobile terminal position information is obtained from the relay station 220, and a transmission request for the control command list is transmitted to the printer $PR_{n+1}$. When the $PR_{n+1}$ receives the transmission request for the control command list, the list of all the control commands executable by the printer $PR_{n+1}$ is transmitted to the print control terminal 100.

When the print control terminal 100 receives the control command list, in steps S306 and S308, the printer $PR_{n+1}$ is registered in the printer registration table 400 so as to correspond to the obtained mobile terminal position information and the received control command list.

A case in which the printer PR is to be cleared its registration from the printer registration table 400 will now be described.

The print control terminal 100 periodically performs the printer deregistration process. When the printer deregistration process is performed, in step S400, a response request is transmitted to all the printers $PR_1$ to $PR_n$ registered in the printer registration table 400. When the printer $PR_2$ is disconnected from the Internet 199, no response is received from the printer $PR_2$. In steps S406 and S408, the print control terminal 100 searches for the mobile terminal 200 which is nearest to the printer $PR_2$ from among the mobile terminals 200 within a predetermined range on the basis of the position of the printer $PR_2$. A presence confirmation request for confirming the presence of the printer $PR_2$ is transmitted to the detected mobile terminal 200.

When the mobile terminal 200 receives the presence confirmation request for confirming the presence of the printer $PR_2$, the user is requested to confirm whether or not the printer $PR_2$ is located nearby. Since the printer $PR_2$ is disconnected from the Internet 199, the user inputs that the printer $PR_2$ is not located nearby. This is transmitted to the print control terminal 100.

Since the print control terminal 100 does not receive the presence confirmation of the printer $PR_2$, in step S414, the printer $PR_2$ is cleared its registration from the printer registration table 400.

The case in which the printer $PR_2$ is disconnected from the Internet 199 has been described. In a case in which the printer $PR_2$ is simply not turned ON and hence the print control terminal 100 receives no response from the printer $PR_2$, the user of the mobile terminal 200 requested to confirm the presence of the printer $PR_2$ is supposed to input the fact that the printer $PR_2$ is located nearby. Thus, the print control terminal 100 receives the presence confirmation of the printer $PR_2$, and the printer $PR_2$ is not cleared its registration from the printer registration table 400.

In this embodiment, the print control terminal 100 obtains mobile terminal position information from the relay station 220. When the distance between the mobile terminal position specified by the obtained mobile terminal position information and the printer position specified by printer position information from the printer registration table 400 is less than the predetermined value A, a print command is transmitted to the printer PR in response to a request from the mobile terminal 200.

Accordingly, the mobile terminal information is obtained from the relay station 220 which is different from the mobile terminal 200. The printer position information is stored in the print control terminal 100 which is different from the printer PR. On the basis of the distance between the mobile terminal position and the printer position, data print control of the printer PR is performed. In contrast to known printing technology, the printer PR can be controlled in accordance with the position of the user who possesses the mobile terminal 200 without providing the mobile terminal 200 and the printer PR with special devices. Since the mobile terminal 200 is not required to perform processing related to controlling the printer PR, the processing load on the mobile terminal 200 can be relatively reduced.

In this embodiment, the print control terminal 100 includes the storage device 42 having stored therein the print specification change command, the attribute confirmation command, and the attribute change command. When the distance between the terminals is less than the predetermined value B and greater than or equal to the predetermined value C, a command list from which the print command and the print specification change command are selectable is transmitted to the mobile terminal 200. When the distance between the terminals is less than the predetermined value C and greater than or equal to the predetermined value D, a command list from which the print command, the print specification change command, and the attribute confirmation command are selectable is transmitted to the mobile terminal 200. When the distance between the terminals is less than the predetermined value D, a command list from which the print command, the print specification change command, the attribute confirmation command, and the attribute change command are selectable is transmitted to the mobile terminal 200.

Accordingly, all the users who possess the mobile terminals 200 can execute these specific control commands when the distance between the terminals is less than a predetermined value. Thus, all the users can execute the specific control commands. At the same time, the users are required to approach the printer PR until the distance between the terminals is less than or equal to a predetermined value in order to execute the specific control commands. When using the printer PR, the convenience of the users is ensured while the possibility of malfunctioning as a result of incorrect settings by the users is further reduced.

In this embodiment, when the print control terminal 100 receives a registration request for registering the printer PR, the print control terminal 100 obtains mobile terminal position information from the relay station 220. The printer PR corresponding to the registration request is registered in the printer registration table 400 so that the printer PR corresponds to the obtained mobile terminal position information.

Accordingly, when registering a new printer PR, the user with the mobile terminal 200 is only required to approach the printer PR to be registered and to transmit a registration request to the print control terminal 100. As a result, the registering operation for registering a new printer PR becomes relatively easy.

In this embodiment, the print control terminal 100 transmits a response request to all the printers $PR_1$ to $PR_n$ in the printer registration table 400. Among mobile terminals 200 which are within a predetermined range on the basis of the position of the printer PR which gives no response, the print control terminal 100 searches for the mobile terminal 200 which is nearest to the printer PR. A presence confirmation request for confirming the presence of the printer PR is transmitted to the detected mobile terminal 200. When no confirmation of the presence of the printer PR is received, the registration of the printer PR is cleared from the printer registration table 400. Accordingly, the possibility of erroneously transmitting a print request and print data to the unavailable printer PR disconnected from the Internet 199 is reduced.

In the foregoing embodiment, the print specification change command, the attribute confirmation command, and the attribute change command correspond to a specific control command.

In the foregoing embodiment, the print control terminal 100 is configured to transmit the print command to the printer PR in response to a request from the mobile terminal 200 when the distance between the terminals is less than the predetermined value A. However, it should be understood that the present invention is not limited to this embodiment. The print control terminal 100 may be configured so that it transmits the print command to the printer PR in response to a request from the mobile terminal, when the distance between the terminals becomes less than the predetermined value A and when a predetermined period of time has passed since the distance between the terminals became less than the predetermined value A.

Accordingly, without providing the mobile terminal 200 and the printer PR with special devices, the printer PR can be notified of a time for starting the printing of the print data when the distance between the terminals becomes less than the predetermined value A and when the predetermined period of time has passed since the distance between the terminals became less than the predetermined value A.

In this case, the print control terminal can correspond to an output control terminal. The printers $PR_1$ to $PR_n$ can correspond to an output terminal.

Alternatively, when the mobile terminal position passes through a predetermined position on the basis of the printer position, when the mobile terminal position approaches the printer position, or when the mobile terminal 200 is directed to the printer PR requested to perform printing, the print command can be transmitted to the printer PR in response to a request from the mobile terminal 200.

In the foregoing embodiment, the predetermined values A, B, C, and D are common among all the printers $PR_1$ to $PR_n$. However, it should be understood that the present invention is not limited to this embodiment. The predetermined values A, B, C, and D can be individually set for the printers $PR_1$ to $PR_n$.

In the foregoing embodiment, user prints the printing data in which the user would like to print, on the printers $PR_1$ to $PR_n$. However, it should be understood that the present invention is not limited to this embodiment. With the use of a projector, a printer, a personal computer, an audio unit, a scanner, a PDA, a portable telephone, a watch-type PDA, or a point-of-sale (POS) terminal instead of the printers $PR_1$ to $PR_n$, service unique to the used unit can be provided.

In the foregoing embodiment, a case in which the control program which is stored in advance in the ROM 32 is executed when performing the processes shown in the flowcharts in FIGS. 4 to 7 has been described. However, it should be understood that the present invention is not limited to this embodiment. The processes can be performed by reading, from a storage device having stored therein a program instructing a processor to perform these processes, the program into the RAM 34.

The storage medium includes a semiconductor storage medium, such as a RAM or a ROM, a magnetic storage medium such as an FD or an HD, an optical storage medium such as a CD, a CDV, an LD, or a DVD, and a magneto-optical storage medium such as an MO. The storage medium includes any type of storage medium regardless of the reading method such as electronic, magnetic, or optical as long as it is a computer-readable storage medium.

In the foregoing embodiment, a case in which the data output system, the output control terminal, the program to be applied to output control terminal, and the data output method according to the present invention are applied to the network system formed by the Internet 199 has been described. However, it should be understood that the present invention is not limited to this embodiment. For example, the data output system and the output control terminal can be applied to an intranet which performs communication using the same system as the Internet 199. Needless to say, the data output system and the output control terminal are not only applicable to the network which performs communication using the same system as the Internet 199 but also applicable to a general network.

In the foregoing embodiment, the data output system, the output control terminal, the program to be applied to output control terminal, and the data output method according to the present invention are applied to a case in which, as shown in FIG. 1, data requested to be printed by the user is printed by the printers $PR_1$ to $PR_n$ connected to the Internet 199. However, it should be understood that the present invention is not limited to this embodiment. The present invention can be applied to other cases without departing from the scope of the invention.

As described above, according to a data output system of the present invention, mobile terminal position information is obtained from a position management terminal which is different from a mobile terminal. Data output control of an output terminal is performed on the basis of the positional relationship between the mobile terminal position and the output terminal position. There is an advantage over known printing technology in that the output terminal can be controlled in accordance with the position of a user who possesses the mobile terminal without providing the mobile terminal with a special device. Since the mobile terminal is not required to perform processing related to controlling the output terminal, the processing load on the mobile terminal can be relatively reduced.

According to a data output system of the present invention, mobile terminal position information is obtained from a position management terminal which is different from a mobile terminal. Output terminal position information is stored in storage device which is different from an output terminal. Data output control of the output terminal is performed on the basis of the positional relationship between the mobile terminal position and the output terminal position. There is an advantage over known printing technology in that the output terminal can be controlled in accordance with a user who possesses the mobile terminal without providing the mobile terminal and the output terminal with special devices. Since the mobile terminal is not required to perform processing related to controlling the output terminal, the processing load on the mobile terminal can be relatively reduced.

According to a data output system of the present invention, there is an advantage in that the output terminal can be notified of a time for starting the outputting of data when the user who possesses the mobile terminal becomes within a predetermined range on the basis of the output terminal position without providing the mobile terminal and the output terminal with special devices.

According to a data output system of the present invention, there is an advantage in that the output terminal can be notified of a time for starting the outputting of data when the user who possesses the mobile terminal becomes within a predetermined range on the basis of the output terminal position and when a predetermined period of time has passed since the user became within the predetermined range without providing the mobile terminal and the output terminal with special devices.

According to a data output system of the present invention, all the users who possess mobile terminals can execute a specific control command if the users are within the predetermined range. Therefore, all the users can execute the specific control command. At the same time, the users are required to be within the predetermined range in order to execute the specific control command. Thus, there is an advantage over known printing technology in that the convenience of the users is ensured while the possibility of malfunctioning as a result of incorrect settings by the users is relatively reduced.

According to a data output system of the present invention, all the users who possess mobile terminals can execute the specific control command when the distance between the terminals is less than or equal to a predetermined value. Therefore, all the users can execute the specific control command. At the same time, the users are required to approach the output terminal until the distance between the terminals becomes less than or equal to the predetermined value in order to execute the specific control command. When using the output terminal, the convenience of the users is ensured while the possibility of malfunctioning as a result of incorrect settings by the users is further reduced.

According to a data output system of the present invention, there is an advantage in that a printer can be controlled in accordance with the position of the user who possess the mobile terminal without providing the mobile terminal and the printer with special devices.

According to a data output system of the present invention, there is an advantage in that a projector can be controlled in accordance with the position of the user who possess the mobile terminal without providing the mobile terminal and the projector with special devices.

According to an output control terminal of the present invention, an advantage equivalent to that of the data output system can be achieved.

According to a program to be applied to output control terminal of the present invention, an advantage equivalent to that of the output control terminal can be achieved.

According to a data output method of the present invention, an advantage equivalent to that of the data output system can be achieved.

What is claimed is:

1. A data output system for establishing a connection between an output terminal that outputs data and a position management terminal that generates mobile terminal position information for specifying the position of a mobile terminal on the basis of a communication state between the mobile terminal and a base station so that the data output system can communicate with the output terminal and the position management terminal, and the data output system outputting data requested by a user of the mobile terminal using the output terminal, the mobile terminal position information being obtained from the position management terminal, and data output control of the output terminal being performed based on a positional relationship between the mobile terminal position specified by the obtained mobile terminal position information and an output terminal position specified by output terminal position information for specifying the position of the output terminal.

2. A data output system for establishing a connection between an output terminal that outputs data and an output control terminal that performs data output control of the output terminal for communication with each other, for establishing a connection between the output control terminal and a position management terminal that generates mobile terminal position information for specifying the position of a mobile terminal on the basis of a communication state between the mobile terminal and a base station for communication with each other, and for outputting data requested by a user of the mobile terminal using the output terminal, the output control terminal including:

a storage device that stores output terminal position information for specifying the position of the output terminal; and a position information obtaining device that obtains the mobile terminal position information from the position management terminal; and the data output control of the output terminal being performed based on a positional relationship between the mobile terminal position specified by the mobile terminal position information obtained by the position information obtaining device and the output terminal position specified by the output terminal position information in the storage device.

3. A data output system according to claim 2, the output control terminal transmitting a data output request to the output terminal when the mobile terminal position is within a predetermined range based on the output terminal position.

4. A data output system according to claim 2, the output control terminal transmitting a data output request to the output terminal when the mobile terminal position is within a predetermined range based on the output terminal position and when a predetermined period of time has passed since the mobile terminal position became within the predetermined range.

5. A data output system according to claim 2, the data output system establishing a connection between the output control terminal and the mobile terminal for communication with each other, the output control terminal including a control command storage device that stores a specific control command for controlling a specific function of the output terminal, when the mobile terminal position is within a predetermined range based on the output terminal position, the output control terminal transmits a list from which the specific control command is selectable to the mobile terminal, and when the output control terminal receives the selection of the specific control command, the output control terminal transmits the specific control command in the control command storage device to the output terminal.

6. A data output system according to claim 5, the output control terminal transmitting the list from which the specific control command is selectable to the mobile terminal when a distance between the output terminal position and the mobile terminal position is less than or equal to a predetermined value.

7. A data output system according to claim 5, wherein, when the output control terminal receives a registration request for registering the output terminal from the mobile terminal, the output control terminal transmits a transmission request for transmitting a control command list to the output terminal corresponding to the registration request, when the output control terminal receives the control command list in response to the transmission of the transmission request, the output control terminal registers the mobile terminal position information obtained by the position information obtaining device as the output terminal position information in the storage device, and registers the received control command list in the control command storage device so that the control command list corresponds to the output terminal position information, and when the output terminal receives the transmission request for transmitting the control command list, the output terminal transmits the control command list, including the specific control command, to the output control terminal.

8. A data output system according to claim 5, the output control terminal transmitting a response request to the output terminal, when the output control terminal receives no response in response to the output request, the output control terminal reads from the storage device the output terminal position information for the output terminal which transmits no response, based on the mobile terminal position information obtained by the position information obtaining device, the output control terminal searches for the mobile terminal which is within a predetermined range based on the output terminal position specified by the read output terminal position information, the output control terminal transmits to the detected mobile terminal a presence confirmation request for confirming the presence of the output terminal which transmits no response, and when the output control terminal receives no presence confirmation in response to the presence confirmation request, the output control terminal clears the registration of the output terminal which transmits no response.

9. A data output system according to claim 2, the output terminal being a printer.

10. A data output system according to claim 2, the output terminal being a projector.

11. An output control terminal for establishing a connection between a position management terminal and an output terminal in a data output system as set forth in claim 2 for communication with the position management terminal and the output terminal, comprising:
    a storage device that stores output terminal position information for specifying the position of the output terminal; and
    a position information obtaining device that obtains mobile terminal position information from the position management terminal;
    data output control of the output terminal being performed on the basis of the positional relationship between the mobile terminal position specified by the mobile terminal position information obtained by the position information obtaining device and the output terminal position specified by the output terminal position information in the storage device.

12. A program to be applied to output control terminal as recited in claim 11, the program making a computer execute processing in which data output control is performed based on the positional relationship between the mobile terminal position specified by the mobile terminal position information obtained by the position information obtaining device and the output terminal position specified by the output terminal position information in the storage device.

13. A data output method, comprising:
    establishing a connection between an output terminal that outputs data and a position management terminal that generates mobile terminal position information for specifying the position of a mobile terminal based on a communication state between the mobile terminal and a base station so that the data output system can communicate with the output terminal and the position management terminal, and
    outputting data requested by a user of the mobile terminal using the output terminal,
    the mobile terminal position information being obtained from the position management terminal, and
    data output control of the output terminal being performed based on a positional relationship between the mobile terminal position specified by the obtained mobile terminal position information and an output terminal position specified by output terminal position information for specifying the position of the output terminal.

14. A data output method, comprising:
    establishing a connection between an output terminal that outputs data and an output control terminal that performs data output control of the output terminal for communication with each other, for establishing a connection between the output control terminal and a position management terminal for generating mobile terminal position information for specifying the position of a mobile terminal on the basis of a communication state between the mobile terminal and a base station so that they can communicate with each other, and
    outputting data requested by a user of the mobile terminal using the output terminal,
    the output control terminal performing the steps of:
        storing output terminal position information for specifying the position of the output terminal; and
        obtaining the mobile terminal position information from the position management terminal; and
    the data output control of the output terminal being performed based on the positional relationship between the mobile terminal position specified by the obtained mobile terminal position information and the output terminal position specified by the stored output terminal position information.

15. A data output method according to claim 14, the output control terminal transmitting a data output request to the output terminal when the mobile terminal position is within a predetermined range based on the output terminal position.

16. A data output system according to claim 14, the output control terminal transmitting a data output request to the output terminal when the mobile terminal position is within a predetermined range based on the output terminal position and when a predetermined period of time has passed since the mobile terminal position became within the predetermined range.

17. A data output method according to claim 14, the data output method establishing a connection between the output control terminal and the mobile terminal for communication with each other,
    the output control terminal stores a specific control command for controlling a specific function of the output terminal, and
    when the mobile terminal position is within a predetermined range based on the output terminal position, the output control terminal transmits a list from which the specific control command is selectable to the mobile terminal, and
    when the output control terminal receives the selection of the specific control command, the output control terminal transmits the stored specific control command to the output terminal.

18. A data output method according to claim 17, the output control terminal transmitting the list from which the specific control command is selectable to the mobile terminal when a distance between the output terminal position and the mobile terminal position is less than or equal to a predetermined value.

19. A data output method according to claim 17, wherein, when the output control terminal receives a registration request for registering the output terminal from the mobile terminal, the output control terminal transmits a transmission request for transmitting a control command list to the output terminal corresponding to the registration request, when the output control terminal receives the control command list in response to the transmission of the transmission request, the output control terminal registers the obtained mobile terminal position information as the output terminal position information, and registers the received control command list so that the control command list corresponds to the output terminal position information, and when the output terminal receives the transmission request for transmitting the control command list, the output terminal transmits the control command list including the specific control command to the output control terminal.

20. A data output method according to claim 17, the output control terminal transmitting a response request to the output terminal, when the output control terminal receives no response in response to the output request, the output control terminal reads the stored output terminal position information for the output terminal which transmits no response, based on the obtained mobile terminal position information, the output control terminal searches for the mobile terminal which is within a predetermined range based on the output terminal position specified by the read output terminal position information, the output control terminal transmits to the detected mobile terminal a presence confirmation request for confirming the presence of the output terminal which transmits no response, and when the output control terminal receives no presence confirmation in response to the presence confirmation request, the output control terminal clears the registration of the output terminal which transmits no response.

* * * * *